United States Patent
Dickens et al.

(10) Patent No.: US 7,231,402 B2
(45) Date of Patent: Jun. 12, 2007

(54) VIDEO SWITCH FOR ANALOG AND DIGITAL VIDEO SIGNALS

(75) Inventors: Nigel Anthony Dickens, Cambridge (GB); Adrian Christopher Dickens, Cambridge (GB); William Haylock, Cambs (GB)

(73) Assignee: Adder Technology Limited, Cambridge (GB)

( * ) Notice: Subject to any disclaimer, the term of this patent is extended or adjusted under 35 U.S.C. 154(b) by 551 days.

(21) Appl. No.: 10/211,887

(22) Filed: Aug. 1, 2002

(65) Prior Publication Data

US 2003/0035049 A1    Feb. 20, 2003

(30) Foreign Application Priority Data

Aug. 8, 2001  (GB) ................................ 0119331.7
Dec. 4, 2001  (GB) ................................ 0128990.9

(51) Int. Cl.
*G06F 17/30* (2006.01)
(52) U.S. Cl. ..................................... 707/104.1; 707/10
(58) Field of Classification Search .............. 707/1–10, 707/100–104.1, 200–205; 715/522; 710/2
See application file for complete search history.

(56) References Cited

U.S. PATENT DOCUMENTS 4,298,957 A * 11/1981 Duvall et al. ................ 715/522
4,775,987 A    10/1988 Miller
5,440,591 A    8/1995 Liron et al.
6,804,724 B2 * 10/2004 Shin ................................ 710/2

FOREIGN PATENT DOCUMENTS

EP    1075111 A1    2/2001
GB    2 345 216 A    6/2000
GB    2 356 516 A    5/2001

OTHER PUBLICATIONS

Dr. Bott MoniSwitch Pro DVI Switch Advertisement, date of publication unknown but the product was available before the filing date of the present application, downloaded from www.drbott.com/prod/MSDVI.html.
Rose Electronics MultiVideo Brochure. May 26, 2000.
Adder Smart View MultiScreen Brochure, date of publication unknown but product available before the filing date of the present application.
TripleMux Advertisement, date of publication unknown but the product was available before the filing date of the present application, downloaded from www.gdsys.de/gen/html/TripleMux.html.

* cited by examiner

*Primary Examiner*—Mohammad Ali
(74) *Attorney, Agent, or Firm*—Beyer Weaver LLP

(57) ABSTRACT

There is provided video switching circuitry for use in a KVM switch and similar devices. Video signal switching circuitry can supply video signals from a one of a plurality of video sources connected to the circuit to a display device connected to the circuit. The high data signalling rate signals are converted into a greater number of lower data signalling rate signals for switching by a bus architecture. Also provided are video display systems in which analogue and digital video signals are switched synchronously to allow them to be displayed on common or separate display devices. Also described is a high-resolution monitor digital video data switching device.

9 Claims, 3 Drawing Sheets

VIDEO SWITCH FOR ANALOG AND DIGITAL VIDEO SIGNALS

Figure 1:
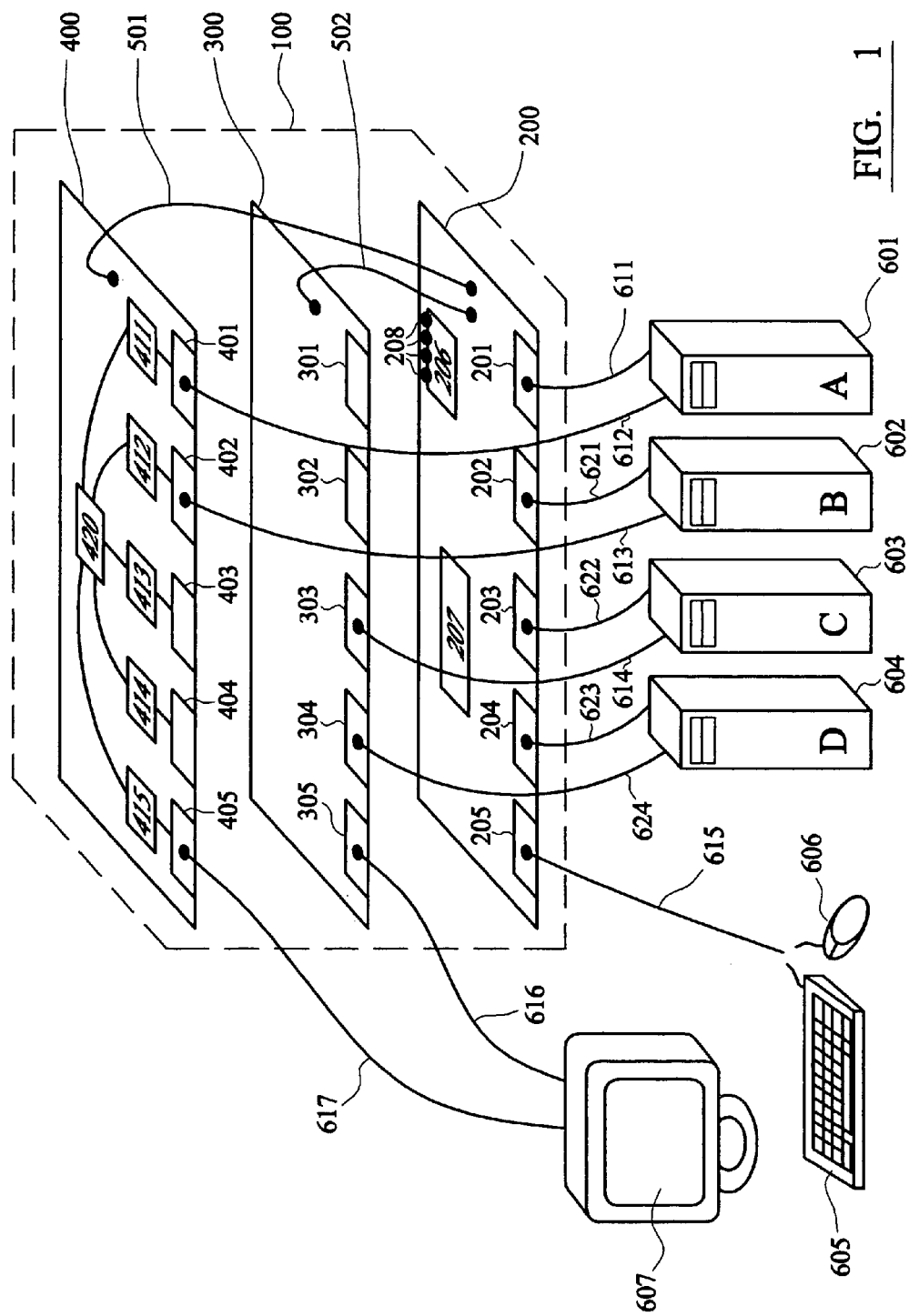

The present invention relates to video signal switching apparatus and circuitry, and in particular to electronic KVM switch circuitry and devices for switching very high speed video signals. The invention can be used to enable video signals from multiple computers with both digital and analogue video interfaces to be displayed.

In modern computing installations it is often useful to be able to use a single keyboard, video monitor and mouse to control several computers. By doing so the cost of additional monitors, keyboards and mice is avoided and a neater, more convenient installation that saves on power and space is provided.

Devices commonly known as KVM (Keyboard, Video monitor and Mouse)switches are used to allow KVM consoles to be shared between several computers. KVM switches are normally electronic devices because mechanical switches offer poor video quality and tend to wear out quickly. They are typically constructed using a microprocessor to signal the keyboard and mouse data and wide bandwidth buffer amplifiers or analogue switches to handle the video signals.

Prior art KVM switches have been designed to switch the analogue video interfaces that are commonly found on personal computers. These interfaces are typically implemented using a 15-way high density D-type connector that carries red, green and blue analogue colour signals and digital horizontal and vertical synchronisation signals. The bandwidth of these signals varies with the pixel resolution and screen refresh rate that the user chooses but a typical bandwidth would be around 100 MHz.

The analogue colour signals are designed to be transmitted along coaxial video cable with a characteristic impedance of 75 ohms. The quality of the video signal is maximised by terminating the video cable with its characteristic impedance in the monitor and ensuring that the coaxial cable acts as closely as possible to an ideal 75 ohm transmission line. However, KVM switches are connected in the video path between the computers and the monitor. The presence of the KVM switch effects the transmission line characteristics of the video path.

An acceptable video picture can be obtained using conventional buffer amplifiers or analogue switches to switch the video signals within the KVM switch. Given good design, the video quality obtained from such KVM switches can be made generally relatively tolerant to small imperfections in the transmission line characteristic of the video path from the computer to the monitor, as the signals are analogue and so the picture will be displayed even if there are imperfections. Minor imperfections are hard to detect with the human eye because they appear as slight colour changes and minor blurring. However, all KVM switches that handle analogue video will introduce some degree of degradation to the video picture. This degradation is more noticeable at higher screen resolutions and refresh rates. Also, in practice the video cables are not ideal transmission lines and so they also introduce a degree of picture degradation. This degradation gets worse as the cable length is increased. While degradation of the video signal can be acceptable for low resolution analogue displays, it is not acceptable for high resolution displays. While digital video signals provide high fidelity, they are very high speed (ie high data signalling rate) and are consequently difficult to switch. If they are not handled correctly then no picture will be displayed at all.

Therefore, there is a need for video signal switching circuitry which can switch digital video signals and provide high fidelity pictures.

According to a first aspect of the present invention, there is provided video signal switching apparatus for supplying video signals from a plurality of video sources connected to the apparatus to a display device connected to the apparatus, the apparatus including: a plurality of video signal deserialising devices each connectable to a one of the plurality of video sources and which convert digital video signals received from a one of the plurality of video sources into video signals having a lower data signalling rate; a video signal serialising device connectable to the display device; and a data transmission means including a switch and which connects the plurality of data deserialising devices to the serialising device, the serialising device converting the video signals into serialised digital video signals having a higher data signalling rate, and in which the data transmission means selectively provides a video signal path between the serialising device and a one of the plurality of deserialising devices.

A single video signal path is provided between the deserialising devices and a serialising device so as to allow high data signalling rate serialised video signals to be converted into a more parallel form at a lower, but still high, data signalling rate for transmission before being re-serialised for output to a display device. Switching the other devices out of the data transmission means ensures that its transmission properties are suitable for the lower rate data signals being transmitted, as discussed below.

Digital KVM switches cannot be practically constructed using commonly available analogue switches or buffer amplifiers, as the bandwidth required for a digital video signalling is much greater than that required for analogue signals. A typical analogue video signal can be passed through multiplexers that have a bandwidth of around 100 MHz. The digital signals used, eg by a DVI interface, may be signalling at a rate of up to 1.65 Gbps. Such a signalling rate requires a bandwidth exceeding 800 MHz. Unlike analogue signals, if the bandwidth of the multiplexer is not sufficient then no video picture will be displayed at all.

A signalling rate of 1.65 Gbs is reaching the speed limit that can practically be transferred using a copper wire video cable. Therefore the transmission line characteristics of the video cable must be closely controlled. At these signalling speeds, small deviations from the ideal characteristic will cause significant distortion to the signal and therefore may cause the transmission of the video picture to fail. The small capacitance of a high bandwidth multiplexer inserted in the video path between the computer and the monitor is large enough to disturb the transmission line characteristics and therefore cause the signal transmission to fail. Furthermore other high bandwidth switching technologies such as PIN diodes have similar associated problems. Consequently a solution similar to that used for analogue video signals is impractical for commercial systems.

The current invention overcomes the problems associated with building a KVM switch with, for instance, DVI interfaces by using DVI receiver (deserialiser) and transmitter (serialiser) chips to convert the very high speed DVI signals to a larger number of lower speed signals. The bandwidth requirement of these lower speed signals is reduced to around 165 MHz. Signals of this speed are still difficult to handle on a shared bus basis without using expensive and power hungry differential bus signalling techniques or power hungry high speed bus drivers. Consequently the invention employs a more economic technique that utilises a switching element to segment the bus that links the DVI receivers to the DVI transmitter. By doing this the invention is able to create a signalling path between any transmitter and the receiver that has sufficiently good transmission characteristics to reliably transmit the digital video signal between the receivers and the transmitter.

Providing a suitable connection between the receiver and transmitter devices is not a simple matter. The receiver and transmitter devices could be connected together using a short interconnection bus that is implemented on a printed circuit board. However, 165 MHz is approaching the maximum speed that can reliably be transmitted on such a bus using the non-differential (single-ended) signalling employed by some such devices. This means that the bus that links the receivers with the transmitters must have excellent transmission line characteristics for the signalling to work.

The transmission line characteristics provided by connecting all the receivers and the transmitter to a shared bus would not be sufficiently good. Such a bus would be several inches long and have a number of stubs where the devices are connected. The signal is reflected from the ends of these stubs causing ringing and signal distortion. In addition the small but significant capacitance of the receiver and transmitter chip distributed along the bus interferes with the transmission line characteristics. The combined effect of these signal distortions would prevent the bus from operating correctly at high frequency. Specialised bus drivers could be used but these are power hungry and expensive making their use commercially impractical in a KVM switch application.

In a preferred form, the current invention overcomes the problems of constructing a suitable bus by using a digital crosspoint switch. The addition of this bus switching element had several beneficial effects. The video path between the selected receiver and the transmitter does not have any unwanted stubs because these are effectively switched out by the switching element. This improves the transmission line characteristics of the bus by minimising the stub reflections. The crosspoint switch isolates the capacitance of the other receiver chips attached to the bus and reduces the distributed nature of the capacitance. The capacitance of the switch itself is relatively low and so it enables the high speed signals to flow from a receiver to the transmitter with sufficiently little signal distortion to ensure that the video signal is transferred reliably. Other programmable logic devices can be used to provide the switching element.

The switching element adds further flexibility to the overall design because it enables additional transmitter chips to be connected to create a DVI crosspoint switching video circuit. Such a circuit provides a KVM switching device that enables more than one KVM console to simultaneously work on different computers that are connected to the same KVM switch. These devices are sometimes referred to as matrix KVM switches.

A further useful advantage of the video switching circuit of the current invention is that it extends the overall length of cable that can be used between the computer and the monitor by receiving and then regenerating the DVI video signals.

Modern display devices, such as flat panel LCD monitors, use a display technology that is different to that used in CRT based display devices and more digital in nature as the picture is divided into discrete pixels. When a flat panel display is driven from an analogue video interface, the video signal pixels may not be displayed in synchronisation with the physical pixels of the display. If the video signal pixels are aligned with the physical display pixels then the picture will be sharper than if the video signal pixels fall on a boundary between the physical display pixels. If a longer cable is used between the computer and the monitor then the video signal will be delayed for longer and the synchronisation between the video signal pixels and the physical display pixels will change. Consequently many flat panel displays have synchronisation adjustments that attempt to align the video signal pixels with the physical display pixels. By adjusting the pixel alignment, the quality and sharpness of the picture is maximised.

The ideal pixel alignment settings vary according to the computer type and the cable length used. When used with a traditional style analogue KVM switch the pixel alignment settings often need to be set to different values to maximise the quality of the video picture from each of the connected computers. Users often require to switch between computers frequently and so aligning the pixels every time becomes impractical. Consequently, some degree of video degradation previously had to have been accepted for reasons of practicality. By using digital video signalling the computer is able to instruct the monitor how to display each pixel. There is therefore no pixel alignment problem. A digital KVM switch therefore allows the video from several computers to a flat panel display to be switched without the need for pixel alignment adjustment, as the physical and logical pixels in a digital system will be the same.

According to a second aspect of the current invention, there is provided video signal switching apparatus for supplying video signals from a one of a plurality of video sources to a display device, the apparatus including: a digital video signal switching circuit including a plurality of source digital video interface each connectable to a one of the plurality of video sources, a display digital video interface connectable to the display and a digital video data switch selectively providing a video signal path between the display interface and a one of the source interfaces; an analogue video switching circuit including a plurality of source analogue video interfaces each connectable to a one of the plurality of video sources, a monitor analogue video interface connectable to the display and an analogue video data switch selectively providing a video signal path between the monitor interface and a one of the source interfaces; and control circuitry which provides a selection signal causing the analogue and digital video switching circuits to switch in synchrony.

The second aspect of the present invention allows a single KVM console to be used to control more modern computers and older legacy systems. In many such scenarios the older computer may be fitted with an analogue video port but no DVI port. The present invention allows a single monitor to be used while a user controls computers with both digital and analogue video ports. It is relatively complicated and costly to perform conversions from analogue to digital video signalling standards and so performing such conversions within a prior art KVM switch is not practical from a commercial point of view.

The present invention also allows a single monitor having analogue and digital video ports to be used as a display while controlling computers with mixed analogue and digital video interfaces. The invention includes a second analogue video switching circuit that is switched in synchronisation with the digital video switching circuit, so that either an analogue or a digital video signal is supplied to the display device. A monitor with both a digital video connector and an analogue video connector can therefore be connected to computers with either digital or analogue video interfaces.

The monitor detects which of the ports (analogue or digital) is currently receiving video information and automatically configures itself to display the video information that is arriving at that port.

When the KVM switch is to be used to connect to computers with both digital and analogue video interfaces, two links are made from the monitor to the KVM switch. A first DVI cable is used to link the monitor's DVI interface to the DVI monitor interface on the KVM switch. A second analogue video cable is used to connect the monitor's analogue video port to the analogue monitor interface on the KVM switch. Computers with DVI video interfaces are then connected to the DVI computer interfaces on the KVM switch using DVI cables. Similarly, computers with analogue video interfaces are connected to the analogue computer interfaces using analogue cables. Only one video connection is made to each computer so either the DVI computer interface or the analogue computer interface on the current invention is left unconnected.

When the user of the KVM switch selects a computer, either a digital video signal or an analogue video signal will be sent to the monitor. If the monitor is set to automatically respond to the incoming video signal it will switch over to use whichever type of signal is currently being supplied by the KVM switch. In this way the current invention enables the video from computers with digital and analogue video interfaces to be displayed on a single monitor without the need for expensive conversions.

The independent terminations of the analogue and digital video switching circuits on the preferred configuration of the invention provide other useful advantages for the user. Widely available standard style cables may be used to connect computers with digital or analogue interfaces. This is convenient and helps to reduce the installation costs. Also, if the user does not have a monitor that accepts both digital and analogue video, the invention provides the user with the possibility of connecting two monitors, one with an analogue video interface and one with a digital video interface. Due to the design of the invention, only one monitor will have a picture at any one time. Consequently, the user may locate the two monitors side by side and look at the monitor that is currently displaying video.

From another perspective, the invention provides a digital video switching device for connecting a monitor to one of a plurality of computers comprising: a plurality of digital video receiver circuits that convert high speed digital video signals into a larger number of lower speed signals; a digital video transmitter circuit that produces high speed digital video signals from a larger number of lower speed signals; a data transmission means connectable between the receivers and the transmitter circuit; a selection signal that controls which receiver circuit is to send data to the transmitter circuit; and a switching means that forms part of the data transmission means and which is controllable by the selection signal in a manner that changes the configuration of the transmission means. The digital video signals can be DVI signals.

Each receiver circuit can be linked to a DVI connector or compatible type connector. The transmitter circuit can be linked to a DVI connector or compatible type connector.

The receiver circuit can be mainly constructed using a DVI receiver or a similar device. The transmitter circuit can be mainly constructed using a DVI transmitter or a similar device.

The switching means can be mainly realised using a digital crosspoint switch or a similar device.

The device can include a plurality of digital video transmitter circuits that produce high speed digital video signals from a larger number of lower speed signals, in which each transmitter is connected to the data transmission means so that data from any receiver may be routed to any transmitter.

The switching means can be a crosspoint switch that enables a first computer to be connected to a first monitor at the same time as a second computer is independently connected to a second monitor.

The selection signal can be realised using several connections that carry logic level voltages.

The data transmission means can include multiple circuit board tracks, some of which are deliberately elongated to minimise the length difference between different tracks and hence minimise the introduction of any timing skew between the signals that they carry.

The present invention also provides a device that enables a monitor to display video from one of a plurality of computers with digital or analogue video interfaces, said device comprising: a digital video switching circuit that contains a plurality of digital video interfaces for connection to computers and a digital video interface for connection to a monitor and that switches a video signal from one of the plurality of computer interfaces to the monitor interface according to a selection signal; an analogue video switching circuit that contains a plurality of analogue video interfaces for connection to computers and an analogue video interface for connection to a monitor and that switches a video signal from one of the plurality of computer interfaces to the monitor interface according to a selection signal; and a selection signal that causes the digital video switching circuit to switch in synchronisation with the analogue video switching circuit.

The device can enable a monitor with digital and analogue video interfaces to display video from one of a plurality of computers with digital or analogue video interfaces by linking the device to both the digital and analogue interfaces of the monitor.

The digital video switching circuit can switch DVI video signals. The analogue video switching circuit can switch red, green and blue analogue colour signals and horizontal and vertical synchronisation signals.

The digital video interfaces can be terminated by means of DVI connectors or compatible type connectors. The analogue video interfaces can be terminated by means of 15-pin-style high-density D-type connectors of the type commonly used to carry analogue video signals.

Preferably, the digital and analogue video switching circuits are constructed on separate physical circuit boards.

Associated digital and analogue interfaces can be terminated on different pins of a common connector. The common connector can be a DVI-I connector.

The invention can also provide a system that enables the video signal from a selected digital or analogue source to be displayed on a monitor comprising: a device as described above; an analogue video source that is connected to an analogue video interface on the analogue video switching circuit; a digital video source that is connected to a digital video interface on the digital video switching circuit; a digital video interface on the digital video switching circuit that is not connected to a digital video source and which is selected in synchronisation with the analogue video interface that is connected to the analogue video source; an analogue video interface on the analogue video switching circuit that is not connected to an analogue video source and which is selected in synchronisation with the digital video interface that is connected to the digital video source; and a monitor with a digital video interface and an analogue video interface that is connected to both the digital video switching circuit and the analogue video switching circuit and that is configured to automatically display the video from whichever interface is currently receiving video information.

The digital and analogue connections from the device to the monitor can be carried along different wires of the same cable.

The invention can also provide a system that enables the video signal from a selected digital or analogue source to be displayed using a digital and an analogue monitor, said system comprising: a device as described above; an analogue video source that is connected to an analogue video interface on the analogue video switching circuit; a digital video source that is connected to a digital video interface on the digital video switching circuit; a digital video interface on the digital video switching circuit that is not connected to a digital video source and which is selected in synchronisation with the analogue video interface that is connected to the analogue video source; an analogue video interface on the analogue video switching circuit that is not connected to an analogue video source and which is selected in synchronisation with the digital video interface that is connected to the digital video source; a monitor with a digital interface that is connected to the digital video switching circuit; and a monitor with an analogue video interface that is connected to the analogue video switching circuit.

Figure 2:
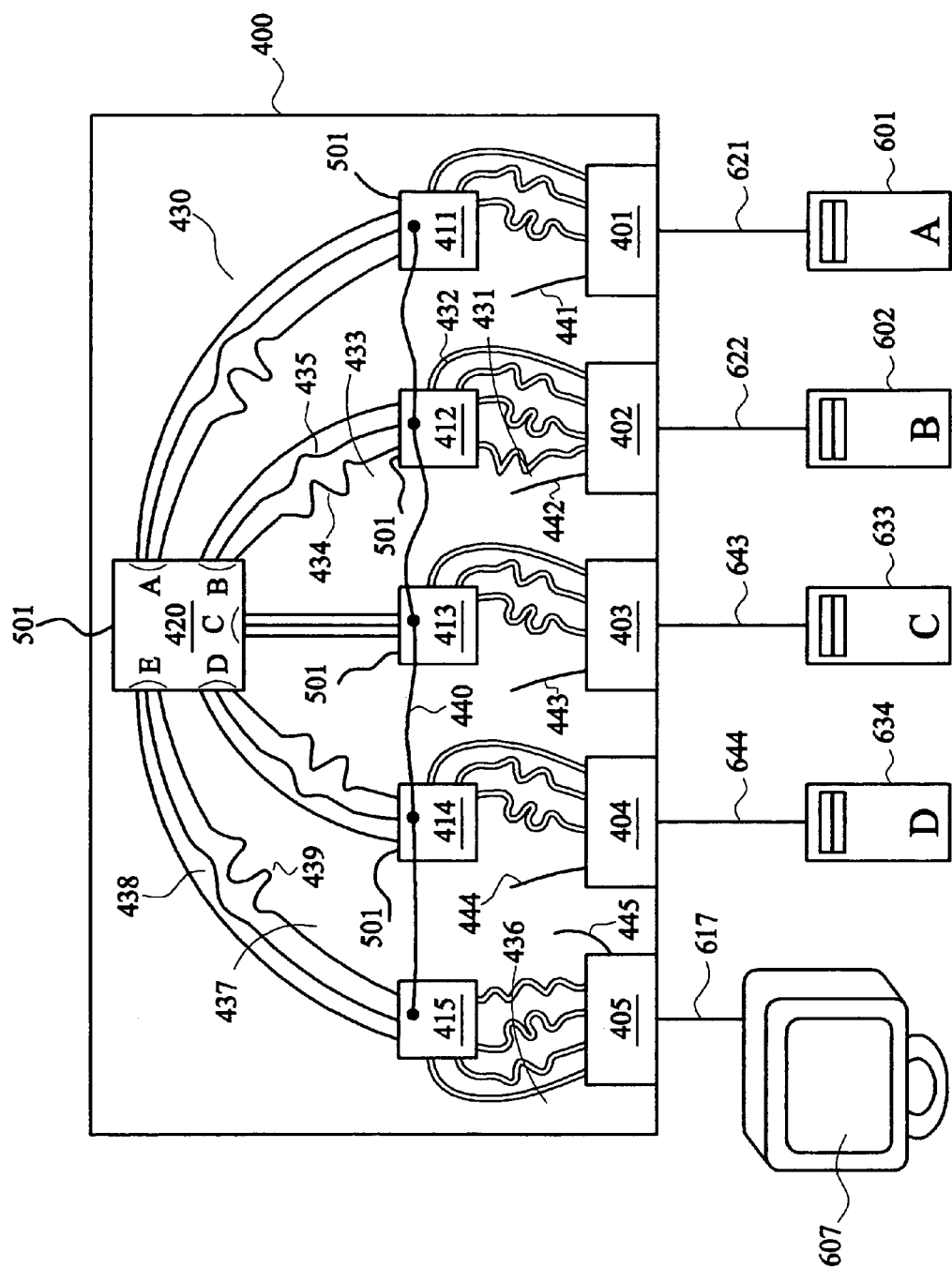
Figure 3:
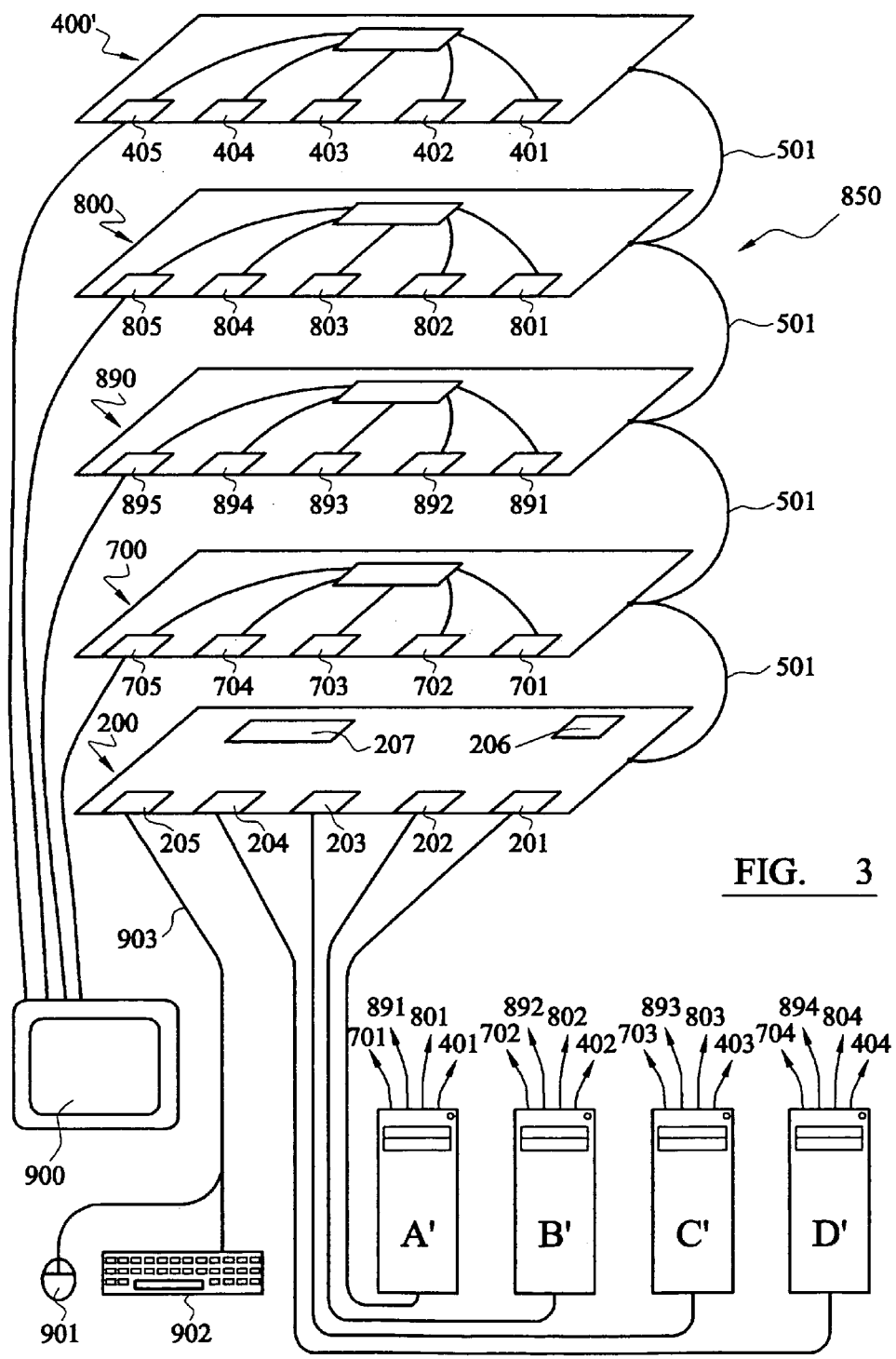

Embodiments of the invention will now be described in detail, by way of example only, and with reference to the accompanying drawings, in which:

FIG. 1 shows a schematic diagram illustrating a KVM switch according to the present invention; and FIG. 2 shows a schematic diagram illustrating a digital video signal switching circuit part of the KVM switch of FIG. 1 according to an aspect of the invention; and FIG. 3 shows a schematic diagram of a video switching device for a very high resolution monitor, including multiple circuits as shown in FIG. 2.

Similar items in different figures share common reference numerals unless indicated otherwise.

FIG. 1 shows a schematic illustration of a KVM switch (100) according to an aspect of the invention. The KVM switch enables a user to control a mixture of computers (601, 602, 603, 604) with DVI (Digital Visual Interface) digital or RGB analogue video interfaces using a shared keyboard (605), monitor (607) and mouse (606). FIG. 1 illustrates a single keyboard, monitor and mouse being used to control four computers (601 to 604) but the invention is not limited in its application to this configuration. Other configurations are envisaged with more or fewer computer connections which would be constructed in a similar manner to the particular embodiment of the invention described. Configurations that enable more than one KVM console (ie more than one collection of keyboard, monitor and mouse) to independently control a group of computers could also readily be constructed.

The KVM switch includes a digital interface and control circuit (200) which is in communication with an analogue video switching circuit (300) and a digital video switching circuit (400) via connections 501 and 502. The analogue switching circuit and digital interface and control circuit are similar to digital interface and control circuits and analogue RGB video switching circuits commonly found in current KVM switches, such as the AdderView GEM manufactured by Adder Technology Ltd and so will not be described in great detail. However, some of the features of these circuits are particular to the present invention as will be appreciated in light of the following description.

The keyboard and mouse interfaces of each of the computers (601 to 604) are connected to respective computer keyboard and mouse interfaces (201 to 204) of the digital interface circuit (200) by means of cables (611 to 614) that carry keyboard and mouse signals. The keyboard (605) and mouse (606) are linked to a keyboard and mouse interface (205) by cables (615) that carry keyboard and mouse signals. The keyboard and mouse are of a PS/2 style and the keyboard and mouse interfaces (205) have a 6-pin mini-DIN connector for the mouse and a 6-pin mini-DIN connector for the keyboard. Other embodiments of the invention may use USB (Universal Serial Bus), ADB (Apple Desktop Bus) or Sun proprietary (a serial keyboard and mouse protocol commonly used on computers manufactured by Sun Microsystems) protocols for keyboard and mouse communication and use different connector types as will be understood by a man of skill in the art.

The digital interface and control circuit includes a microcontroller circuit (207) which is in communication with a control circuit (206) that contains key controls and indicators that enable the user of the KVM switch to select a required one of the computers (601 to 604). The microprocessor circuit routes the keyboard and mouse data from the keyboard and mouse interface 205 to the selected computer, and vice versa. The microprocessor also signals to the analogue video switching circuit (300) and the digital video switching circuit (400) to tell each of them which of computers A, B, C or D is currently selected.

The analogue video switching circuit (300) includes conventional analogue video data switching circuitry which under control of a selection signal from the microprocessor 207 switches the video signals from the selected one of analogue video interface ports (301,302,303 or 304) to a common analogue monitor interface (305) that is connected to the analogue interface port of the monitor (607) via an analogue video connection (616). The switched video signals include the red, green and blue colour signals, the horizontal and vertical synchronisation signals and the DDC (Display Data Channel) signals. The analogue video interfaces (301 to 305) of the analogue video switching circuit (300) are terminated with 15-pin-style high-density D-type connectors of the type commonly used for analogue video connections. This provides ease of use with legacy systems.

The digital video switching circuit (400) routes the video signals from a selected one of digital video interface ports (401 to 404) to a common digital monitor interface (405) that is connected to the digital interface port of the monitor (607) via a digital video connection (617). The digital video interfaces (401 to 405) of the digital video switching circuit (400) are terminated with DVI connectors such as the Molex MicroCross (tm) DVI connector, or any other suitable DVI connector of the style that are commonly used for DVI digital video connections.

FIG. 2 shows a block diagram of the main components of the digital video signal switching circuit (400) of the current invention. The circuit includes four DVI video interfaces (401, 402, 403, 404) which are implemented essentially by a connector, and associated ancillary circuitry, allowing connection to a respective one of computers A, B, C and D and one DVI video interface (405), again implemented essentially by a connector, allowing connection to a monitor. Each of the interfaces are terminated with a DVI connector such as a Molex MicroCross (tm) DVI connector or compatible type connectors. As will be appreciated the circuitry is not limited to a single DVI monitor interface and more than one monitor interface and more or less than four computer interfaces could be provided with suitable modifications to the circuitry as would be apparent to a man of skill in the art in light of this description.

The DVI video port of each computer (601, 602, 633, 634) is linked to a respective DVI video interface (401 to 404) via a DVI cable (621, 622, 643 and 644). This DVI cable carries high speed DVI digital video signals in a serial form from the computer to the video switching circuit (400). The cables also carry DDC (Display Data Channel) signals in both directions between the computers and the video switching circuit (400) and HPD (hot plug detect) signals to the computer. To maximise the performance of the invention the various components that form part of the video circuit (400) are carried on a multiple layer circuit board (430) where one of the layers is used mainly as a ground plane.

Each DVI computer interface (401 to 404) connector is linked to a SERDES (Serialiser/Deserialiser) device, such as a Silicon Image SiI 161A receiver circuit, (411, 412, 413 and 414) by four pairs of copper circuit board tracks (431) on the circuit board (430). (Only three tracks are shown in FIG. 2 for receiver chips 411, 413 and 414 for the sake of clarity). An alternative device to the Silicon Image SiI 161A would be a TFP 401 AP ZP as provided by Texas Instruments. The DVI signal includes red, green, blue video signals and a clock timing signal which are encoded and serialised and then transmitted from the computer as a high speed TMDS (Transition Minimised Differential Signal) to the connector. Each of the colour signals and the timing signal are carried by a one of the pairs of circuit board tracks (eg 432) as a differential signal. The tracks are arranged so as to ensure that the track length from the connector to the receiver chip is substantially the same for each of the differential signals. This minimises the timing skew between the signals which is important for reliable operation. The track lengths are minimised. Also the configuration of track widths, spacings and proximity to the circuit board ground plane is chosen so as to match to the impedance of the video cable as well as possible. This minimises the signal distortion.

A single DVI link is shown in FIG. 2: ie only one set of red, green and blue colour signals and associated timing signal. In a higher resolution alternative, two or more links can be provided. Increasing the number of links increases the signal bandwidth and therefore the resolution of the image. A two link alternative could be implemented using two sets of red, green and blue video signal paths and either one or two timing signal tracks from the connector. The two timing signal track alternative is effectively two single links in parallel. As will be appreciated, the switch will need scaling accordingly as will the number of links provided at the monitor transmitter chip and interface.

The Silicon Image receiver circuits (411, 412, 413 and 414) are deserialising devices that deserialise the high speed DVI video signals (431) from the computer into a larger number of slower speed signals (433). These signals are slower in speed than the serialised signals but are still very fast in electronic switching terms. The serialised DVI signals are converted by the receiver chips into a more parallel data form allowing them to be transmitted over the relatively simple bus architecture described.

Each of the Silicon image receivers (411 to 414) is connected to a common high speed digital crosspoint switch (420) via a multiple link bus connection implemented by copper circuit board tracks (e.g. 433). This is a 26 bit bus comprising 24 data signals, a clock signal and a data enable signal. In an alternative embodiment, the bus is a 28 bit bus and the extra two bits carry the vertical and horizontal synchronisation signals respectively, when the speed of these signals warrants. In the present embodiment, the vertical and horizontal synchronisation signals are supplied by the receiver chips to the transmitter chip along a common bus (440) as they are sufficiently slow. Each of the signal tracks from any one receiver (e.g. 412) to the crosspoint switch is made to be approximately equal in length so as to minimise any timing skew between the slower signals output from the receiver. This can be achieved by deliberately elongating the lengths of certain tracks by adding additional waves and bends (434, 435).

The DVI interface on the monitor (607) is linked to the DVI monitor interface (405) via a DVI cable (617). On some models of monitor the DVI cable (617) may be permanently attached to the monitor (607). This DVI cable carries high speed DVI digital video signals from the video switching circuit (400) to the monitor (607). The cable also carries DDC (Display Data Channel) signals in both directions between the monitor (607) and the video circuit (400). The cable also carries a hot plug detect signal from the monitor.

The DVI monitor interface (405) connector is linked to a serialising device such as a Silicon Image SiI 164 transmitter circuit (415) via four pairs of copper circuit board tracks (436) on the circuit board (430). The red, green, blue and clock signals are each carried by a one of the pairs of tracks as pairs of differential signals. The DVI monitor interface is terminated by a Molex MicroCross (tm) DVI connector, or compatible type connector, to link to the DVI video cable (617).

Each pair of circuit board tracks carries a one of the red, green and blue colour signals as a differential signal and the tracks are arranged so as to ensure that the track length from the connector to the transmitter is the same for each of the differential signals. This minimises the timing skew between the signals which is important for reliable operation. The track lengths are also minimised and the track widths, spacings and proximity to the circuit board ground plane are configured so as to match to the impedance of the cable as much as possible. This minimises the signal distortion.

In an alternative embodiment, the circuit tracks are not all made the same length by adding bends, but instead any timing skews of the signals are corrected by programming the switch to introduce appropriate delays so as to synchronise the signals at the switch. An active skew cancellation function can be provided in which the switch is used to monitor for any inappropriate skews between signals and increase or reduce delays as appropriate to ensure the signals are actively maintained in synchrony. Non-winding tracks are easier to fabricate and take up less space on the circuit board.

The Silicon Image transmitter circuit (415) is essentially a SERDES device and acts as a serialiser to convert the video signals with a lower data signalling rate (437) back into the serialised DVI digital video signals (436) having a higher data signalling rates that are transmitted to the monitor (607) via the DVI cable (617).

The Silicon Image transmitter chip (415) is connected to the common high speed digital crosspoint switch (420) via a multiple link bus connection implemented by copper circuit board tracks (437). This is a 26 bit bus comprising 24 data signals, a clock signal and a data enable signal, but can be a 28 bit bus if required and as described above. Each of the signal tracks from the transmitter (415) to the crosspoint switch is made to be approximately equal in length so as to minimise any timing skew between the slower signals. This can be achieved by deliberately elongating the lengths of certain tracks by adding additional waves and bends (438, 439).

Control signals are supplied via connection 501 from other circuits within the KVM switch (200) that specify which one of the computers=video signals (A, B, C or D) is to be displayed on the monitor (607). The control signals include transmitter and receiver enable signals and a one-of-four selection signal to select the active receiver. The digital crosspoint switch (420) responds to these signals by connecting all the signals of only the buses for the receiver associated with the selected computer (A, B, C or D) to the common bus (E) that is connected to the transmitter (415). This action connects only a one of the receivers to the transmitter.

A suitable digital cross point switch would be a Lattice ispGDX 160VA crosspoint switch. Other alternative devices would include devices such as a Xilinx or Altera FPGA, CPLD, ASIC or any other high speed programmable logic circuit.

Importantly, this bus structure creates a bus connection providing a video signal path between the selected receiver (411, 412, 413 or 414) and the transmitter (415) that does not have unwanted stubs. Also the bandwidth, capacitance and other characteristics of the digital crosspoint switch provide minimal distortion to the video signals flowing along the bus. Consequently the high speed digital video information is transferred reliably from the selected receiver to the transmitter via the switched bus.

It would be possible to transfer information from the receivers to the transmitter by connecting all the buses (A, B, C, D and E) together. However, the effects of the receivers=capacitance and the bus stubs are sufficient to require the use of expensive additional differential bus driving circuitry or power hungry high speed bus drivers in order to allow reliable data transfer at the high speeds required.

The video signal that needs transferring from a receiver (e.g. 411) to the transmitter (415) includes the horizontal and vertical synchronisation signals that are relatively low speed signals. There is no need to feed these signals through the crosspoint switch (420) because they can easily be transmitted on a shared bus illustrated schematically in FIG. 2 by line 440. The receiver circuits use the control signals supplied from the digital control circuitry (200) to determine which receiver will transmit a signal on the bus. Only one of the receiver circuits is enabled to transmit at any one time. The horizontal and vertical synchronisation signals are transmitted on the slower speed shared bus (440).

In addition to switching the video signals the DDC signals from the computers (441, 442, 443, 444) and the DDC signal of the monitor (445) are exchanged. The monitor hot plug detect signal is also provided from the monitor to the computers. A multiplexer device (not shown), such as a Pericom PI5C3253 dual 4 to 1 multiplexer, is used to supply the computer DDC signals (441–444) extracted by the computer interfaces (401–404) to the monitor DDC signal (445) via the monitor interface (405). This enables each computer to communicate with the monitor and to find out information about the monitor and which video resolutions are supported. The computer then configures its video output signal to match the capabilities of the monitor. The hot-plug detect signal from the digital monitor interface (405) is also switched through to the selected computer interface (401 to 404) using analogue switches (not shown). This enables the computer to detect the attachment of a monitor.

As described above, the DDC connections use analogue switches. This is a cost effective solution, but does not enable the computer to read DDC information when it is not the selected computer. In an alternative embodiment, the digital video switching circuit includes a microprocessor circuit that reads the DDC information from the monitor and stores this information in memory. Further microprocessor circuitry communicates the information stored in memory back to a computer when DDC information is requested by the computer. In this embodiment the computer can read DDC information about the monitor even when it is not currently selected.

In use, the microprocessor (207) located on the digital interface circuit (200) monitors the state of the key controls (208) within the control circuit (206). It also monitors the keyboard data that is being sent from the keyboard (605) to detect certain >hotkey=combinations of key strokes. By using the hotkeys or the key controls (208) a user can select the required computer (A to D). When the microprocessor detects a switching request from the user it changes the routing of the keyboard and mouse data on the digital interface circuit (200) and signals the change to both the digital (400) and analogue (300) video switching circuits via connections 501 and 502.

The invention is configured so that the routing of the keyboard and mouse signals within the digital interface circuit (200) changes in synchronisation with the routing of the video signals within the digital (400) and analogue (300) video switching circuits. For example, if the keyboard and mouse data arriving at interface 205 is routed to interface 202 (computer B) then video information arriving at interface 302 will be routed to the analogue monitor interface (305) and video information arriving at interface 402 will be routed to the digital monitor interface (405) by the bus and switch providing a digital video signal path between receiver 412 and transmitter 415 only.

FIG. 1 shows a KVM switch including the digital video signal switching circuitry connected to two computers with digital video interfaces (601 and 602) via digital video interface cables (621, 622) and to two computers with analogue video interfaces (603, 604) via analogue video interface cables (623, 624). Where a connection is made from a computer to a digital video interface the corresponding analogue interface is left disconnected (301, 302). Where a connection is made from a computer to an analogue video interface the corresponding digital video interface is left disconnected (403, 404). This means that when a one of the computers is selected, a video signal will be present at either the digital monitor interface (405) or the analogue monitor interface (305) but not both.

Monitors are available with both digital and analogue interfaces that are configured to display the video picture from the port that is currently receiving a video signal. Because the KVM switch prevents both a digital and an analogue video signal from the computers being supplied to the monitor connector at the same time, a monitor of this type will automatically display the video signal from the selected computer regardless of whether the computer has a digital or analogue video interface.

DVI connectors are available in several different styles. One style, known as DVI-D, only has sufficient pins to carry digital video. Another style, known as DVI-I has additional pins that carry RGB analogue video. The DVI-I connector may be used by a computer to present both digital and analogue video signals and therefore provide the facility to connect to monitors with digital or analogue interfaces. Ideally monitors that have both digital and analogue interfaces should only carry a DVI-D style connector and have a separate 15-pin high-density D-type connector for the analogue interface. The reason for this is that the some DVI connectors only have the facility for one DDC connection and the monitor should ideally report different capabilities to the computer via the DDC link depending on whether the video connection is to be digital or analogue.

In an alternative embodiment of the invention, each pair of associated digital and analogue video interfaces (e.g. 301 and 401) is terminated using a single DVI-I connector that has connections for both digital and analogue video signals. Configuration settings or detection circuitry are then used to select which DDC information is communicated to the computer. In a further alternative embodiment the analogue and digital monitor interfaces are terminated using a single DVI-I connector that has connections for both digital and analogue video signals.

DVI video interfaces may be implemented using either a single or dual digital video link. A dual link system is designed to provide a higher bandwidth video capability but otherwise uses similar signalling techniques to a single link system.

The embodiment of the current invention described is designed for single link systems. An alternative embodiment supports dual (or greater) link DVI video and is constructed by duplicating circuitry to support the second link.

A further alternative embodiment of the invention is illustrated in FIG. 3. This embodiment provides still higher video bandwidth for very high-resolution computer monitors. In this embodiment, a video switching device 850 for a very high-resolution display device 900 is schematically illustrated. A digital interface and control circuit 200 is connected to four digital video signal switching circuits (400', 800, 890, 700) all similar to circuit 400. Each of the video switching circuits includes a single link DVI interface 405', 895, 605, 705 each connected by a DVI cable to a single high-resolution monitor, such as a model T221 as supplied by IBM Corporation.

Each computer (A=, B=, C=, D=) provides multiple single link digital video output signals each of which is connected to a corresponding digital interface connector on a separate digital switching circuit. For example the four single link outputs from computer A=are connected to 401, 801, 891 and 701. When a switching control signal is supplied from control circuitry 200, then all four output signals from a one of the computers are connected to the monitor for display. In this way the high-resolution output of different computers can easily be switched between a common high resolution monitor.

A further embodiment would include multiple links for each DVI interface. As described above, a multiple link DVI interface comprises two or more single link DVI interfaces, which provide a maximum video bandwidth equal to the sum of the bandwidths of the single links. Either a single digital video switching circuit having multiple links or a plurality of digital video switching circuits each having the same number of multiple links could be provided.

A further embodiment, in which more than one monitor interface is provided, would provide the switch with a broadcast functionality such that when a receiver chip is selected, the video signal is broadcast to all the monitor interfaces so that the video data can be viewed on multiple monitors. Only a single video signal path from the receiver chips to the switch is provided, but the switch/broadcaster would provide multiple signal paths from the switch to the monitor interfaces.

In a further embodiment, broadcast apparatus is provided which is essentially the opposite of the switching apparatus. A single receiver chip is provided which receives DVI signals from a single computer. The switch is replaced by a broadcast device and a plurality of transmitter chips are provided. The broadcast device broadcasts the single set of video signals as multiple sets of video signals (one for each transmitter chip) over a bus so that the same video image can be displayed on each monitor connected to the transmitter chips.

The invention claimed is:

1. Video signal switching apparatus for supplying video signals from a one of a plurality of video sources to a display device, the apparatus including:
   a digital video signal switching circuit including a plurality of source digital video interface each connectable to a one of the plurality of video sources, a display digital video interface connectable to the display and a digital video data switch selectively providing a video signal path between the display interface and a one of the source interfaces;
   an analogue video switching circuit including a plurality of source analogue video interfaces each connectable to a one of the plurality of video sources, a monitor analogue video interface connectable to the display and an analogue video data switch selectively providing a video signal path between the monitor interface and a one of the source interfaces;
   wherein the analogue and digital video interfaces are associated in pairs;
   an analogue video source connected to a source analogue video interface of a first pair;
   a digital video source connected to a source digital video interface of a second pair not the same as the first pair; and
   a display connected to both the monitor analogue and digital interfaces such that the display will display an image for only a one of the video sources at a time; and
   control circuitry which provides a selection signal causing the analogue and digital video switching circuits to switch in synchrony.

2. Apparatus as claimed in claim 1 in which pairs of associated digital and analogue interfaces are terminated by a common connector.

3. Circuitry as claimed in claim 2, in which the connector is a DVI-I connector.

4. A video display system including apparatus as claimed in claim 1 and a display, in which the display is capable of displaying analogue or digital video signals.

5. A system as claimed in claim 4, in which the display comprises two display devices, one capable of displaying images from analogue video signals and the other capable of displaying images from digital video signals.

6. A system as claimed in claim 4, in which the display comprises a single device that can automatically display an image from either analogue video signals or from digital video signals.

7. A system as claimed in claim 1, in which the display comprises two display devices one of which is connected to the monitor analogue interface and the other of which is connected to the monitor digital interface.

8. A system as claimed in claim 1, in which the display is a single device.

9. A system as claimed in claim 4 and including a cable connecting the display to the circuitry, in which digital and analogue video signals are carriable to the display over different wires of the same cable.

* * * * *